United States Patent
Dein et al.

(10) Patent No.: US 12,451,238 B2
(45) Date of Patent: Oct. 21, 2025

(54) AUTOMATED CONTINUOUS INSTRUMENT TRACKING SYSTEM

(71) Applicant: Surgical Safety Scanner, Inc., Brighton, MI (US)

(72) Inventors: John Richard Dein, Fair Oaks, CA (US); Fredrick P. Schoville, Brighton, MI (US)

(73) Assignee: Surgical Safety Scanner, Inc., Brighton, MI (US)

( * ) Notice: Subject to any disclaimer, the term of this patent is extended or adjusted under 35 U.S.C. 154(b) by 0 days.

(21) Appl. No.: 17/634,583

(22) PCT Filed: Sep. 1, 2021

(86) PCT No.: PCT/US2021/048764
§ 371 (c)(1),
(2) Date: Feb. 11, 2022

(87) PCT Pub. No.: WO2022/051432
PCT Pub. Date: Mar. 10, 2022

(65) Prior Publication Data
US 2023/0178222 A1    Jun. 8, 2023

Related U.S. Application Data
(60) Provisional application No. 63/073,059, filed on Sep. 1, 2020.

(51) Int. Cl.
*G16H 40/20* (2018.01)
*A61B 90/98* (2016.01)
(Continued)

(52) U.S. Cl.
CPC .............. *G16H 40/20* (2018.01); *A61B 90/98* (2016.02); *G06K 7/10128* (2013.01); *G01S 5/04* (2013.01)

(58) Field of Classification Search
None
See application file for complete search history.

(56) References Cited

U.S. PATENT DOCUMENTS

2005/0009122 A1* 1/2005 Whelan .................. B01L 3/545
                                                                         435/7.32
2006/0232408 A1* 10/2006 Nycz ..................... A61B 90/90
                                                                         340/572.1
(Continued)

FOREIGN PATENT DOCUMENTS

EP            2881875 A2    10/2015
WO    WO-2018098503 A1 *  5/2018 ............. G16H 40/20

OTHER PUBLICATIONS

G. Gupta, B. P. Singh, A. Bal, D. Kedia and A. R. Harish, "Orientation Detection Using Passive UHF RFID Technology [Education Column]," in IEEE Antennas and Propagation Magazine, vol. 56, No. 6, pp. 221-237, Dec. 2014, doi: 10.1109/MAP.2014.7011063. (Year: 2014).*

(Continued)

*Primary Examiner* — Evangeline Barr
*Assistant Examiner* — Austin Rivoire Amacher
(74) *Attorney, Agent, or Firm* — Rudy J. Ng; Bozicevic, Field & Francis LLP (57) ABSTRACT

Methods and systems are disclosed for automated and continuous instrument tracking and management thereof. The method includes receiving a list of medical tools or instruments, associating each medical tool within the list a status, monitoring information associated with a radio frequency identification (RFID) associated with a first medical tool, wherein the monitoring is executing using a plurality of sensors, detecting a presence of the first medical tool based upon the monitoring; and changing the status associated with the first medical tool based upon the detecting.

26 Claims, 5 Drawing Sheets

(51) Int. Cl.
*G01S 5/04* (2006.01)
*G06K 7/10* (2006.01)

(56) References Cited

U.S. PATENT DOCUMENTS

| | | | | |
|---|---|---|---|---|
| 2007/0083286 | A1* | 4/2007 | Kobayashi | G16H 40/20 |
| | | | | 700/214 |
| 2008/0147529 | A1* | 6/2008 | Kreiner | G06Q 10/087 |
| | | | | 340/572.1 |
| 2010/0017224 | A1* | 1/2010 | Kreiner | G08B 21/02 |
| | | | | 340/572.1 |
| 2013/0201003 | A1* | 8/2013 | Sabesan | G01S 13/878 |
| | | | | 340/10.1 |
| 2014/0032231 | A1* | 1/2014 | Semen | G16H 20/40 |
| | | | | 705/2 |
| 2014/0263633 | A1* | 9/2014 | Schmucker | G16H 40/40 |
| | | | | 235/385 |
| 2016/0028836 | A1* | 1/2016 | Diem | H04W 4/30 |
| | | | | 455/456.1 |
| 2016/0117449 | A1* | 4/2016 | Hunn | G16H 10/60 |
| | | | | 713/193 |
| 2016/0212577 | A1* | 7/2016 | Dor | G06F 16/24553 |
| 2017/0124836 | A1 | 5/2017 | Chung et al. | |
| 2019/0051408 | A1* | 2/2019 | Hanajima | G06Q 10/10 |
| 2019/0385732 | A1 | 12/2019 | Schoville et al. | |
| 2020/0250356 | A1 | 8/2020 | Santarone et al. | |
| 2020/0394367 | A1* | 12/2020 | Fleetwood | A63F 9/24 |

OTHER PUBLICATIONS

C. Wang, H. Wu and N. -F. Tzeng, "RFID-Based 3-D Positioning Schemes," IEEE Infocom 2007—26th IEEE International Conference on Computer Communications, Anchorage, AK, USA, 2007, pp. 1235-1243 (Year: 2007).*

Ma, Xiaoyu, et al. "RFID-based healthcare workflow management in sterile processing departments." IISE Annual Conference. Proceedings. Institute of Industrial and Systems Engineers (IISE), 2012. (Year: 2012).*

* cited by examiner

AUTOMATED CONTINUOUS INSTRUMENT TRACKING SYSTEM

CROSS REFERENCE TO RELATED APPLICATIONS

This application claims the benefit of PCT Patent Application No. PCT/US21/48764 filed Sep. 1, 2021, which claims the benefit of U.S. Provisional Application No. 63/073,059 filed on Sep. 1, 2020 which is hereby incorporated herein by reference.

TECHNICAL FIELD

This disclosure relates to medical tool preparation and management, and more particularly to systems and methods for automatically tracking and managing medical tools associated with a medical procedure.

BACKGROUND

The statements in this section merely provide background information related to the present disclosure and may not constitute prior art.

To prevent unintentional retention of a medical or surgical item (RSI's), the items must be accounted for by counting before a procedure, or e.g., during personnel shift changes, prior to closure of the procedure, prior to closure of a body cavity and after the procedure to confirm that all items are present outside of the patient. In medical/surgical operating rooms, policies mandate that instruments are to be counted manually. Furthermore, each counting event is performed simultaneously and audibly by two operating room personnel, to confirm that the medical instruments are present. Physically tracking a location of medical instruments is currently done manually by technicians, nurses, and doctors within the room and relies upon human memory during and between counts. While the instruments are in use, it can be difficult to track and manage the medical instruments manually, particularly during long and complex procedures, which can often involve dozens or even hundreds of instruments many of the same size and make and model-differing only by a serial number, if present. This current counting and locating process is dependent on manual human activity and memory and therefore inherently prone to errors in counting, recording of counting and memory.

Therefore, a need exists for a system to automatically and continuously track and manage the surgical instruments and/or other medical tools, including a quantity and a tool location, before, during, and after the medical procedure.

SUMMARY

Methods and systems are disclosed for automatically tracking and managing medical tools associated with a medical procedure.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As used in the description herein and throughout the claims, the following terms take the meanings explicitly associated herein, unless the context clearly dictates otherwise: the meaning of "a," "an," and "the" includes plural reference, the meaning of "in" includes "in" and "on." The term "based upon" is not exclusive and allows for being based on additional factors not described, unless the context clearly dictates otherwise. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. "Automatically" as used herein is defined as without human intervention and without intervention from another entity.

Figure 1:
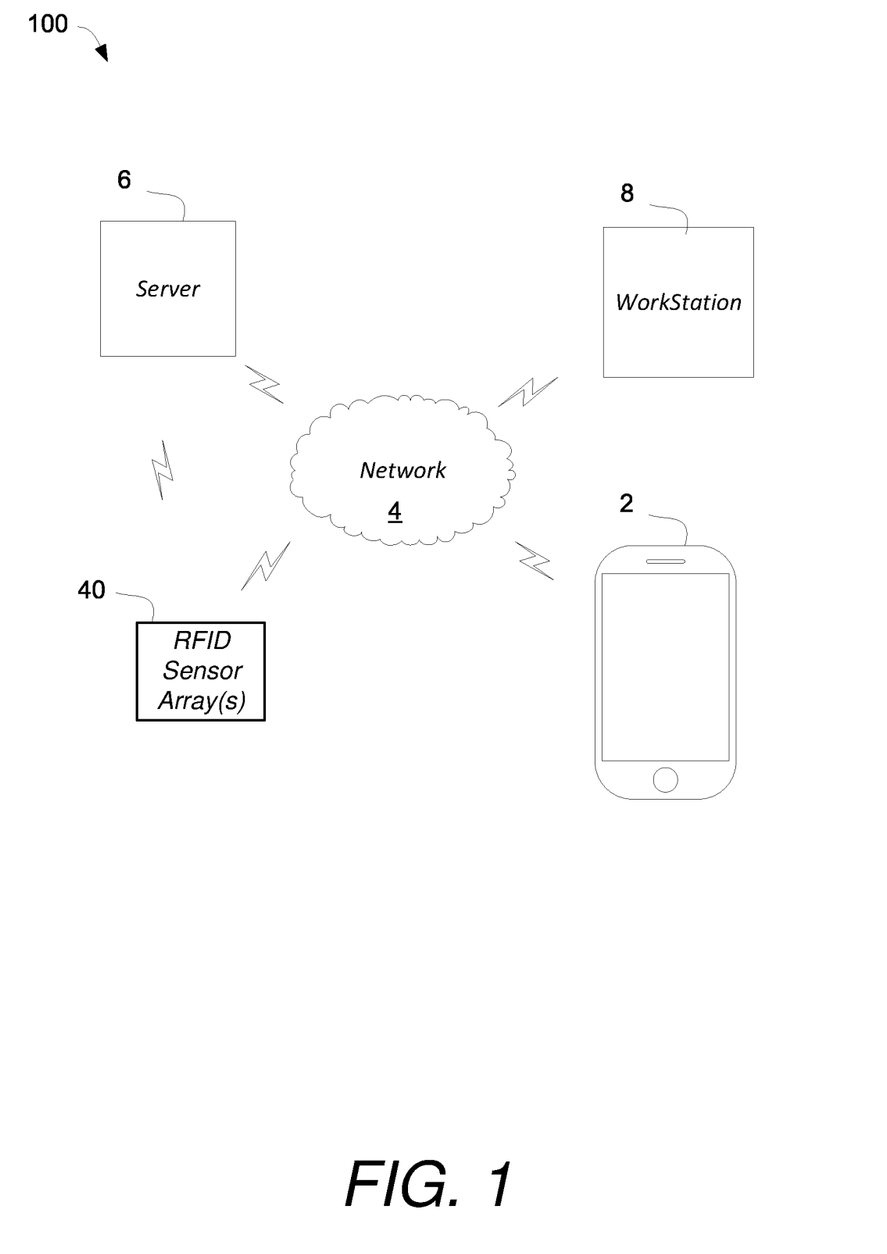
FIG. 1 schematically shows an exemplary automatic tracking and medical tool management system, in accordance with the present disclosure.

Referring now to the drawings, wherein the depictions are for the purpose of illustrating certain exemplary embodiments only and not for the purpose of limiting the same, FIG. 1 schematically shows an exemplary automated continuous instrument tracking system 100 that may help implement the methodologies of the present disclosure. The system 100 can include a mobile device 2, a network 4, a server system 6, a workstation computer 8, and a medical tool RFID sensor array 40. As shown in FIG. 1, the RFID sensor array or arrays 40 may be communicatively connected to one or more computing devices including a server 6, a workstation computer 8, and/or a mobile device 2. The RFID sensor array 40 may be indirectly communicatively connected to the one or more computing devices via the network 4 or directly communicatively connected via wireless protocol. Any one or more of the one or more computing devices may be communicatively connected to one another. For example, the server system 6 may be directly communicatively connected to the workstation computer 8 and the mobile device 2. The mobile device 2 may be physically or wireless connected to the network 4 or the workstation computer 8 during selected periods of operation without departing from the teachings herein. Components of the system 100 are shown in FIG. 1 as single elements. Such illustration is for ease of description and it should be recognized that the system 100 may include multiple additional mobile and computing devices. In various embodiments, the system 100 may operate without one or more of the mobile device 2, the network 4, the server system 6, and the workstation computer 8.

The network 4 may be any suitable series of points or nodes interconnected by communication paths such as a local wired and/or wireless network. The network 4 may be interconnected with other networks and contain sub networks network such as, for example, a publicly accessible distributed network like the Internet or other telecommunications networks (e.g., intranets, virtual nets, overlay networks and the like). The network 4 may facilitates the exchange of data between and among the RFID sensor array 40, the mobile device 2, the workstation computer 8, and the server system 6, as requested.

The server system 6 and/or the workstation computer 8 may each be: various embodiments of a computer including high-speed microcomputers, minicomputers, mainframes, and/or data storage devices. The server system 6 preferably executes database functions including storing and maintaining a database and processes requests and store information from the RFID sensor array 40, the mobile device 2 and/or the workstation computer 8 to extract data from, or update, a database as described herein below. The server 6 may additionally provide processing functions for the RFID sensor array 40, the mobile device 2 and the workstation computer 8 as will become apparent to those skilled in the art upon a careful reading of the teachings herein. In various embodiments, the database is a blockchain.

In addition, one or more of the RFID sensor array 40, the mobile device 2 and the workstation computer 8 may include one or more applications that the user may operate. Operation may include downloading, installing, turning on, unlocking, activating, or otherwise using the application. The application may comprise at least one of an algorithm, software, computer code, and/or the like, for example, mobile application software. In the alternative, the application may be a website accessible through the world wide web, for example.

The system 100 may include various non-volatile memory devices, BLE tags, BLE communications devices, WIFI communications devices, one or more Video Camera devices, one or more motion detection devices, and/or one or more still cameras.

The RFID sensor array 40 may be incorporated into, or disposed proximate to, working surfaces, trays, tables, walls, and ceilings, for example. The sensor array 40 may be formed of any number of individual sensors or groups of sensors. In one embodiment, sensors may be proximate to a location on the sterile field of the operation. For example, built into the scrub nurse or technician's back table(s), the operating room table(s) upon which a patient rests and/or larger tables and/or the Mayo stand type and/or smaller tables. Sensors may be disposed or proximately location outside of the operative sterile environment. In one embodiment, non-sterile back tables utilized to determine status of instruments which have been contaminated or damaged and removed from the sterile environment to prevent reuse on that particular patient may include sensors or have sensors of the array 40 located proximately thereto. The sensor array 40 may include any number of antennas.

In operation, the system can determine the status of RFID labeled items intraoperative and non-intraoperatively and is configured to determine and display continuously updated determination of each item's status as to whether the uniquely labelled item is either "present" or "checked in." In one embodiment, "present" and/or "checked in" may be defined as being sensed by the system and counted. In one embodiment, a status may be "absent or checked out" defined as not been sensed and counted as such.

In various embodiments, the system can include one or more similar flat surfaces on or built into horizontal and/or vertical sensors. The system can be incorporated within the operating room and/or hospital, but other medical environments are contemplated. The sensors of the system can include a location on the sterile field of the operation meaning on or built into the scrub nurse or technician's back table(s), the operating room table(s) upon which the patient rests and/or larger tables and/or the Mayo stand type and/or smaller tables.

The sensors 40 of the system 100 can include any other location outside of the operative sterile field. The system 100 may be configured for continuous integrated sensing system in real-time to determine status of instruments which have been contaminated or damaged and removed from the sterile field to prevent reuse on that particular patient. In one embodiment, the system 100 may associate a status of these damaged or contaminated instruments to inhibit their use, such as "damaged", "contaminated" or simply "do not use."

In various embodiments, the system 100 can continuously and automatically gather in real-time data specific and characteristic of any and all sub-classifications of scanned items in addition. For example, data gathered may include "in use" or "not in use", "present" or "not present", ON the sterile field, OFF the sterile field, ON the sterile field and within the patient, ON the sterile field but not within the patient, OFF or ON the sterile field and contaminated, OFF or ON the sterile field and damaged, OFF or ON the sterile field and in need of repair or maintenance, in use at present or at any time during the operation by any one or more particular staff member or never used by one or more particular staff member during the operation, OEM vs. hospital ownership. In various embodiments, scannable and gatherable classification derived from scanning and sensing when combined with previously known preoperative or intraoperative databases of information in addition to yet to be determined item characteristics as desired by the hospital or operating room staff to assist in optimization of individual item use or surgical tray optimization may be incorporated into the system 100. The system 100 may use location data to infer status or classification of scanned items, which may then be continuously and automatically updated in the database. Status or classification can be varied by location per item. For example, the system 100 can label a particular item "present" with respect to a certain table, room, storage container, or sterilizer device, and "not present" with respect to another table, room, storage container or sterilizer device. In another example, an item may register first location at a certain timestamp. At a second timestamp, if the item has a different location, the system 100 can infer a change in status or classification, e.g., "non-use" to "used." Likewise, if the item has the same location at the second timestamp, the status or classification can remain "non-used."

In various embodiments, the automated continuous gathering and/or usage of data gathered to communicate patient or equipment or other identified status or information immediately and/or in delayed fashion to other entities and devices within the medical environment. For example, information and status may be transmitted with or outside of the individual operating room suite, meaning but not limited to the operating room staff. In some embodiments, the information may be transmitted to authorized uses associated with any individual hospital departments or systems, the departments or systems of hospital groups or chains, individual or groups of patients or patient families, physicians or surgeons and/or their offices or staffs, OEM or other entities present at the operation or remote from the site.

In one embodiment, the system 100 may or may not have a built-in scale to monitor the weight of the instruments and collect weight information automatically.

In one embodiment, the system 100 is configured to continuously and automatically monitor and record all instruments used in the operation and collect such data.

In one embodiment, the system 100 is configured to continuously and automatically collect data of each time and each duration of each use of each instrument by each individual.

In one embodiment, the system 100 is configured to continuously and automatically collect data to track the order of use of each instrument at each operation.

In one embodiment, the system 100 is configured to continuously track and automatically collect data on instruments that were not used during each operation.

In one embodiment, the system 100 may have a built-in video to continuously and automatically monitor each use of each instrument used at each operation.

In one embodiment, the system 100 may have a built-in camera to continuously and automatically monitor each use of each instrument used at each operation.

In one embodiment, the system 100 may have a motion detection to continuously and automatically integrate with a BLE tag to monitor and record the individual person using each instrument.

In one embodiment, the system 100 is configured to continuously and automatically track and collect data on the use of instruments and other supplies including any RFID labelled item(s) used in or outside the operating the operating room.

In one embodiment, the system 100 is configured to continuously and automatically track the preventative maintenance schedule for each individual instrument, collect such data and automatically send out alerts for scheduled maintenance.

In various embodiments of the system 100 items may be RFID tagged. Readers, sensors, or a sensor array may be used to 'sense' the RFID tags. Transceivers may be used in one embodiment. Various antennas and arrangements of antennas may be used.

In operation, the system 100 automatically and continuously track the inventory of any instrument group utilizing a series of readers and devices, including overhead array scanners, directional array scanners, back table scanners, Mayo-stand scanners, laundry, and trash scanners. The instrument groups may be user-generated within the system 100 and may be populated or categorized via association with a particular surgeon or a particular operation. The BLE/RTLS tracking system will have the ability to track the actual individual using the exact instrument.

In one embodiments, the system 100 may be configured to sense the RFID and or non-volatile memory chips mounted on the instruments and tools, and thereby automatically and continuously monitor the use, or non-use and other characteristics of instruments as well as maintenance schedules, and inventory management, in real time.

In various embodiments of the system 100, a surgeon or other medical personnel will wear and/or be associated with a proximal unique RFID tag. In this way, when they are proximate to other labeled items or instruments the system can infer and update status or classifications of those items or instruments. For example, when a surgeon or other medical personnel is proximate to a surgical device, the system 100 may change a status or classification of the surgical device to "not sterile" or "in use." In various embodiments, graphical or video information may be used to confirm proximity or determine proximity. In one embodiment, status or change in classification may be personnel-dependent. That is, a change in status or change in classification may depend upon the specific personnel that is proximate to the item.

In various embodiments, the system 100 may track location, status as to counted status and subclassification of instrument status are known and recorded automatically and continuously.

In various embodiments, the system 100 may be configured to send alerts automatically for preventive maintenance care on tools and instrument and other data on patient or operating room equipment status can similarly be sent automatically.

Figure 2:
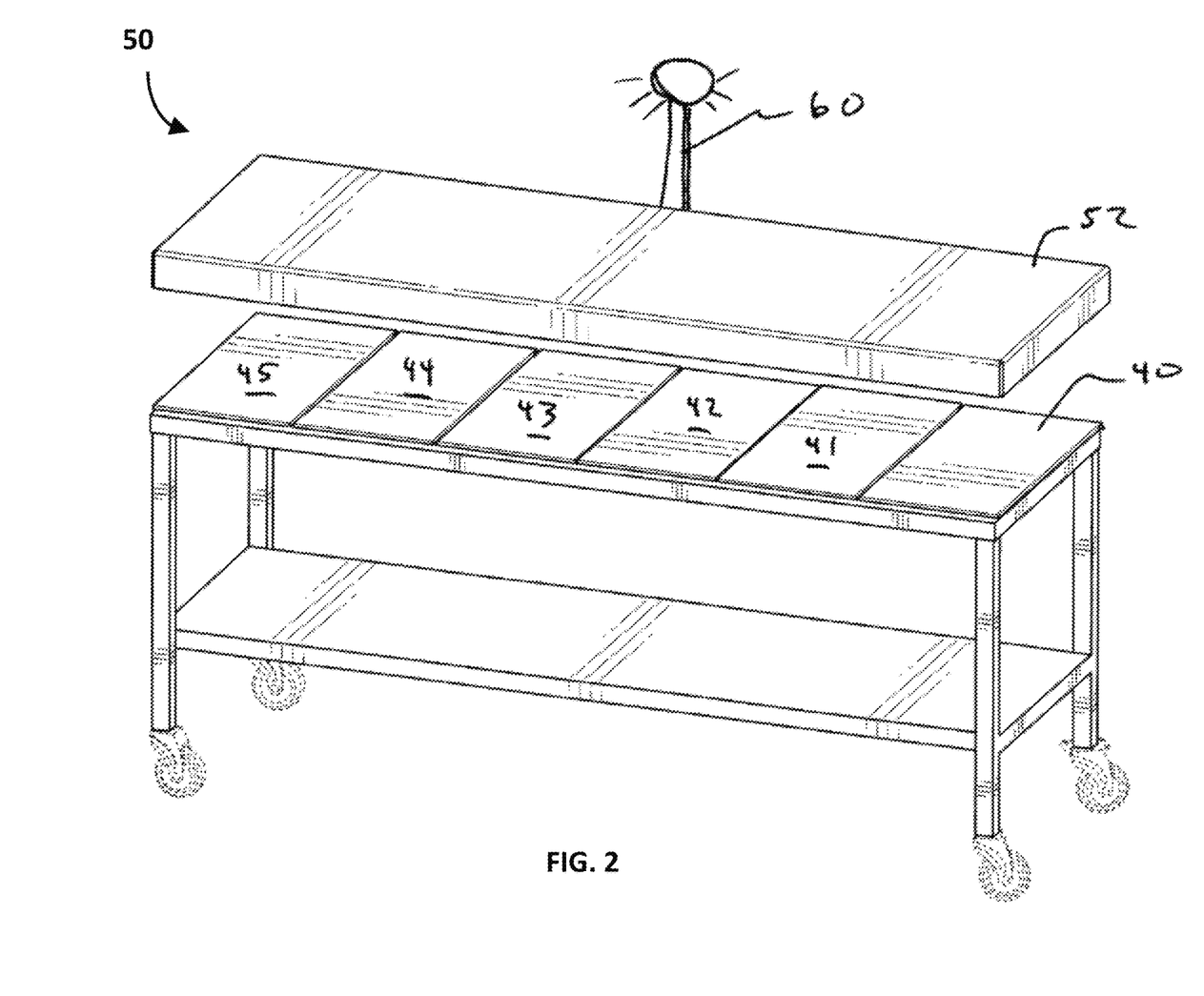
FIG. 2 is a partially exploded view of an exemplary scanning table, in accordance with the present disclosure.

Referring now to FIG. 2, which depicts a partially exploded view of an exemplary scanning table 50. The scanning table 50 includes a table-top surface 52 and a plurality of sensor arrays 40, 41, 42, 43, 44, and 45. FIG. 2 is depicted with the table-top surface 52 exploded from the sensory arrays 40-45. The exemplary table-top surface 52 is sized and configured to fit over the sensor array 40. In one embodiment, the sensory array 40 is embedded into the table-top surface 52 or coupled to a bottom surface thereof. In one embodiment, the sensory array 40 is proximate to the table-top surface 52.

In one exemplary embodiment, a plurality of arrays are used. The arrays 40 may be different sizes and/or include varying amounts of sensors. The arrays 40 may also have different arrangements of the sensors within the array 40.

For example, as FIG. 2 shows, arrays 40, 41, 42, 43, 43, 44, and 45 may be used in one system. As described hereinabove, the arrays 40-45 may have any number of sensors, e.g., six arrays to as many as 2880 or more arrays. Having the arrays 40-45 spaced over an area gives the ability to determine location of a tool based upon a received signal strength. In this way, a time stamped X-Y-and Z coordinate of the instrument location may be automatically generated. In one embodiment, a beacon scanner 60 may be mounted or movable on the scanning table 50 or another part of a room, e.g., a ceiling. In one embodiment, the beacon scanner is moveable on a track, which may be attached to the table. In embodiments having a moveable beacon, location determination processes accounts for changing position of the beacon 60 when determining location of the items. The beacon scanner 60 may be configured to rotate to scan over the table 50. In one embodiment, the beacon scanner 60 is configured to continuously scan up to 360 degrees in all 3 spatial planes. Information received by the beacon 60 may be used to calculate a position of an instrument based on the signal strength it receives to help calculate the X-Y-and Z coordinates on the table. In various embodiments, one or more beacons can be incorporated to increase location determination accuracy.

Figure 3:
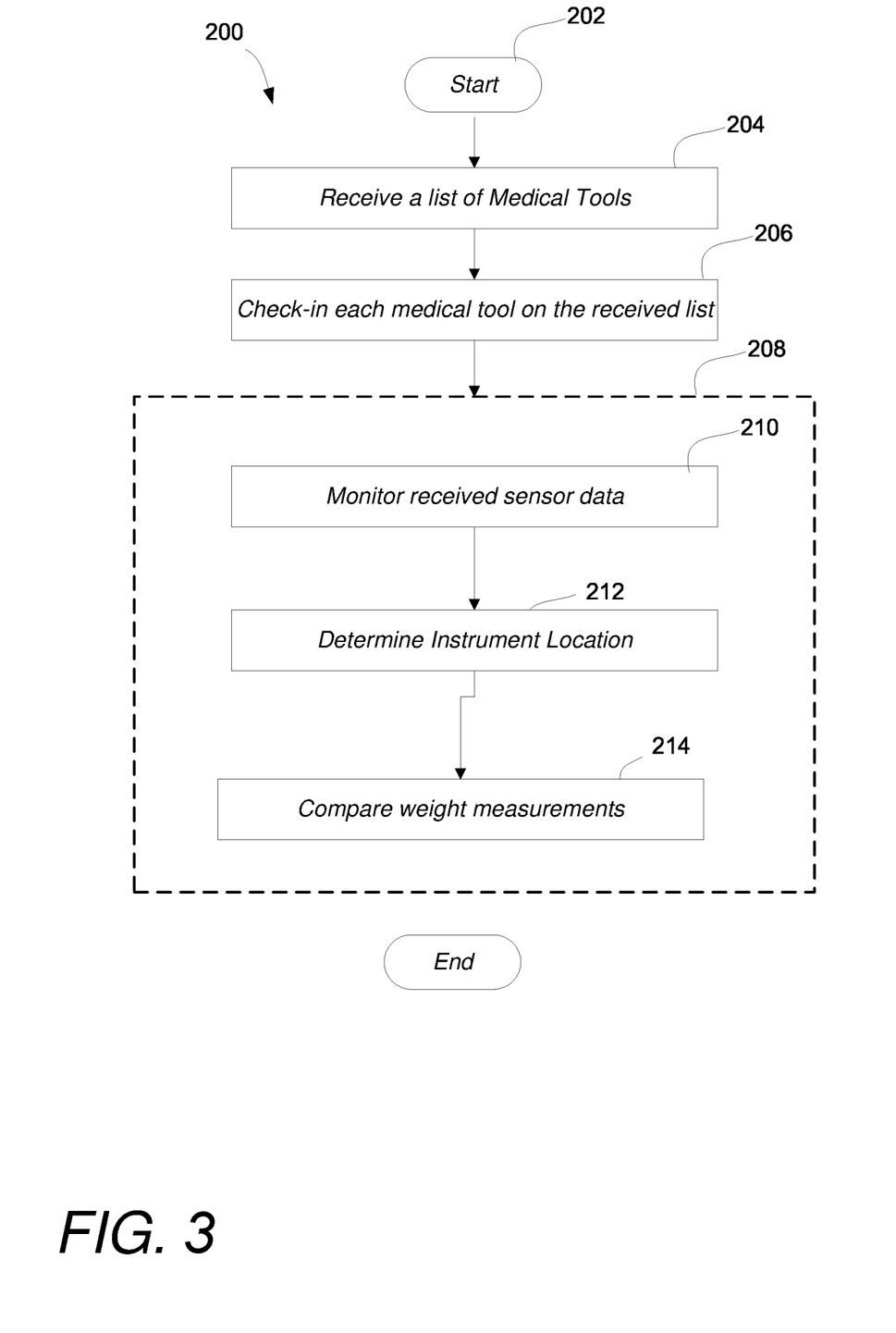
FIG. 3 shows an exemplary process, in accordance with the present disclosure.

Referring now to FIG. 3, one embodiment of a generalized method 200 for automated and continuous instrument tracking is illustrated. The method 200 may be utilized in conjunction with the system 100 and the sensor array 40. The system 100 is capable of selectively communicating with one or more computing devices within the exemplary system 100 as will be discussed in more detail below.

The method 200 may be initialized manually or automatically in accordance with other executing processes. In one embodiment, the method 200 is initialized by simply turning the system 100 to an ON operating state. In one embodiment, the method 200 is initialized by receiving instructions from a computer program or operator to start 202.

At step 204, the system 100 receives information associated with a set of medical tools and instruments associated with an upcoming medical procedure. In one embodiment, the information includes a list of medical tools necessary for the procedure and a check-in status of each item contained within the list.

At step 206, each medical tool is checked in. The check in procedure may include individually and/or manual scan in. The system 100 may establish a positive check-in status by confirming the identification of the tool via an RFID tag, weight measurement, and/or graphical camera data. The instrument present sensor may be utilized to begin or end identification of the medial tool. For example, initially the surface 14 is clear of medical tools. Upon breaking a zone proximate to the surface, the instrument present sensor reports that a medical tool is present. This reporting may be used to initialize further sensor inquiry into the identification of the medical tool. For example, upon reporting that a medical tool is present, the RFID sensor 40 may turn to an ON operating status and attempt to read an RFID tag.

Step 206 may be continuous. In various embodiments, simultaneous check-in of multiple medical tools via RFID sensing may occur. Manual check-in of items by a personnel may simultaneously executed along with the RFID sensing.

At step 208, the check in procedure is completed and the system 100 is transitioned to a real-time scanning mode of operation. Initially, all of the checked-in medical tools are initially present.

During the real-time scanning mode, the system 100 monitors information from the sensor array 40, any connected video or graphical devices at step 210. At step 212 the system determines and monitors location of various instruments. The location is used to determine medical instrument status. This indication may be made in any number of ways depending upon the specific type of location and location path that is determined based upon information from the sensor array 40.

In various embodiments, the system 100 may log historical information about the items. For example, item use may be logged. In a surgical environment, events may be associated with the item e.g., heart surgery, operating room XYZ, surgeon X, and a timestamp corresponding to the event.

The system 100 may be informed via a selectable operating mode. For example, the surgical process may take the form of a first mode being tray building and item collection in preparation for a procedure. A second mode may occur in the operating room before, during and after a surgery procedure. A third mode may be post-surgery check-out, A fourth mode may be clean-up or sterilization. Depending on the mode that the system 100 is in, status or classification of the items may be inferred via location.

In various embodiments, operating modes of the system 100 may be fixed to a certain location. For example, one operating mode of tray building may occur in the sterile processing department (SPD). The second operating mode can be in the operating room (OR) which means before, during and after the operation and then there is the third operating mode is back in the SPD where the cycle ends and begins again with cleaning, sterilization and tray building.

The system 100 may use camera data to execute object recognition algorithms to determine or confirm a medical tool is sensed. In one embodiment, breach of a pre-defined detection zone may initialize the camera to record an image or record a video. In this way, a visual record of the change in medical tools may be obtained for subsequent retrieval. In one embodiment, the camera data may be associated with a particular medical tool if the medical tool had a status change, i.e., from checked-in to checked-out, or vice versa. In one embodiment, the system 100 and camera may have the ability to count the instruments as well as track pre-surgery, real-time during surgery, and post-surgery. The system 100 may be included in multiple locations such as ultra sound, or x-ray room in a medical environment.

The system 100 may monitor and detect RFID tags from one or more medical tools. In one embodiment, signal attenuation or amplification associated with a particular signal is indicative of a removal or return of a medical tool. In one embodiment, signals from the one or more RFID sensors 40 may be compared to determine whether an RFID tag on a medical device is moving, which is indicative of its removal or return. For example, an item may register with a first signal strength at a certain timestamp. At a second timestamp, if the second signal strength differs be greater than a threshold amount, the system 100 can infer a change in status or classification, e.g., "sterile" to "not sterile."

In one embodiment, a sensor zone is established over the surface in a way that does not detect RFID tags on the medical instruments on the surface, but detects RFID tags as they are placed on the surface or removed therefrom. In one embodiment, camera data supplements RFID sensor data to determine if the medical tool was removed or returned. For example, an object, post detection of a change in RFID signals, being detected by the camera indicates the return of the item, while an absence of an object from the surface 14 indicates the removal of the item.

The system 100 may then display the item status, update a database, or transmit the status to one or more devices, upon occurrence of an event or upon a request.

Figure 4:
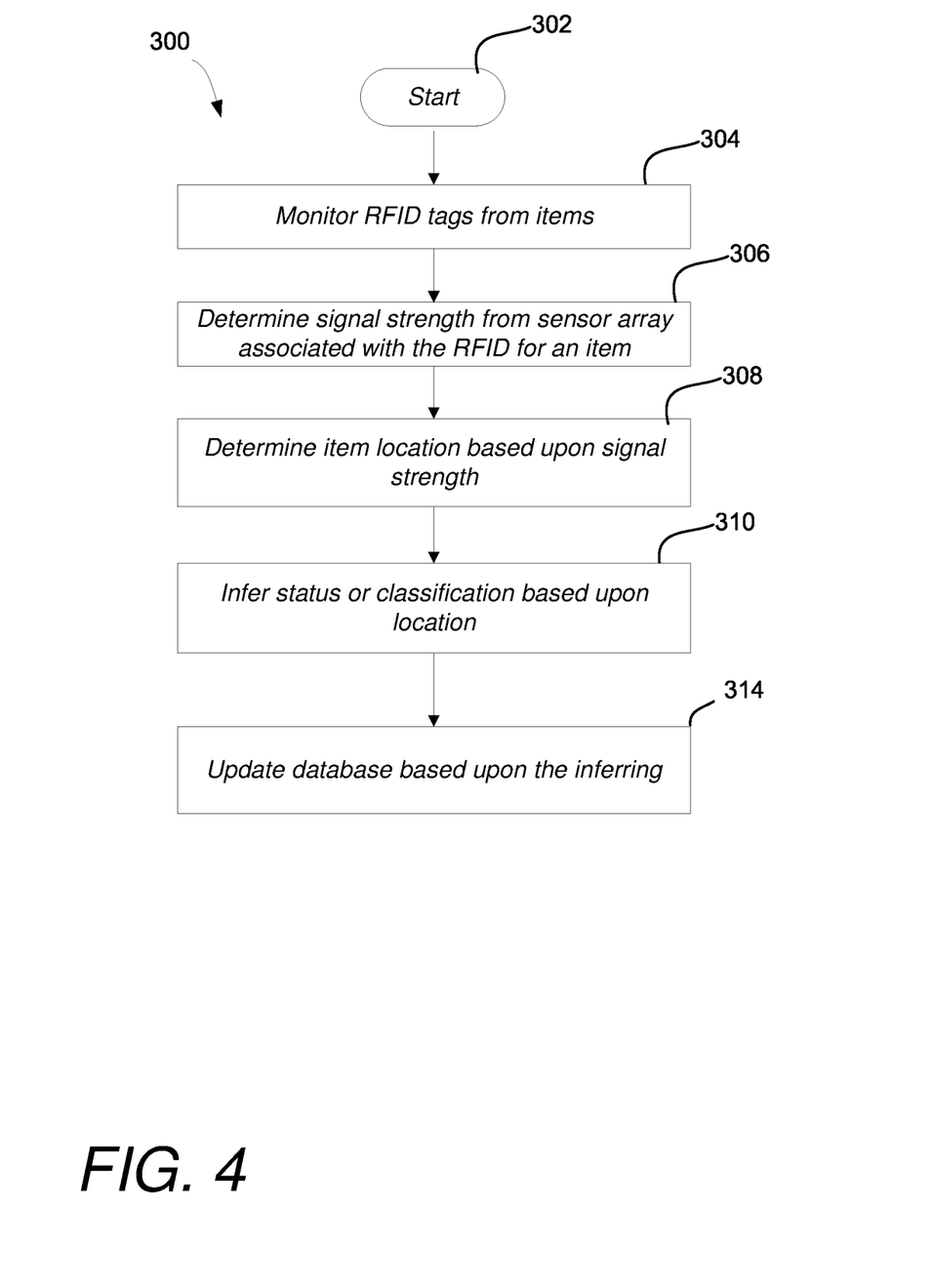
FIG. 4 shows another exemplary process, in accordance with the present disclosure.

Referring now to FIG. 4, one embodiment of a generalized method 300 for automated and continuous instrument tracking based upon location is illustrated. The method 300 may be utilized in conjunction with the system 100 and the sensor array 40 and the process 200, in one embodiment. The system 100 is capable of selectively communicating with one or more computing devices within the exemplary system 100 as will be discussed in more detail below.

The method 300 may be initialized manually or automatically in accordance with other executing processes. In one embodiment, the method 300 is initialized by simply turning the system 100 to an ON operating state. In one embodiment, the method 200 is initialized by receiving instructions from a computer program or operator to start 302.

At step 304, the system associates each sensory in the array 40 and/or the plurality of arrays 41, 42, 43, 44, or 45 with an X and Y-coordinate.

Figure 5:
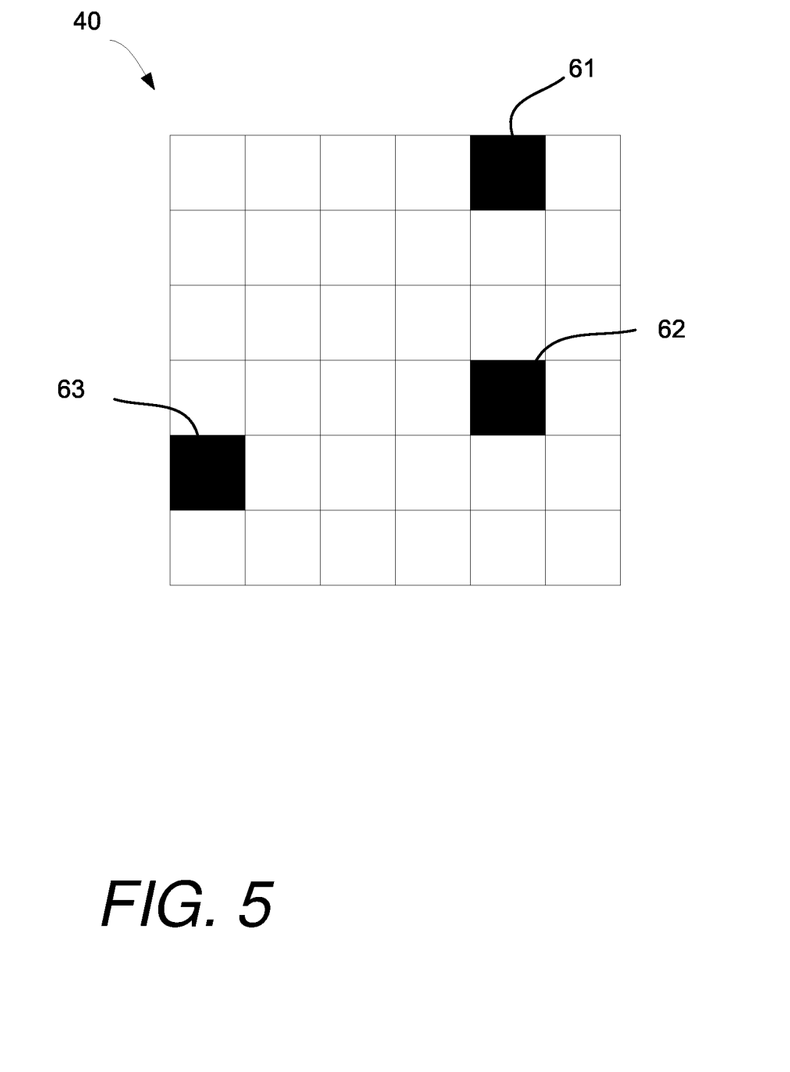
FIG. 5 schematically shows an exemplary sensor array, in accordance with the present disclosure.

At step 306, the system 100 monitors RFID tags from one or more items. The monitoring can include sensing from one or more sensory arrays 40 including individual sensors within the array. At step 308 the system 100 determines a signal strength from one or more sensors within the sensory array 40 that have sensed the item. For example, as FIG. 5 schematically shows, an exemplary 6×6 sensory array 40, may include sensors 61, 62, and 63. These sensors 61, 62, and 63 may have sensed the item and therefore have a signal strength, i.e., signal amplitude, associated with that sensing. In various embodiments and applications, one or more of the sensors of the array 40 may have sensed the item, including e.g., the entire array 40. To determine height i.e., the Z-coordinate, signal strength from the beacon 60 may be used.

At step 310, the item location is determined based upon the received signal strength. An X-Y coordinate location may be determined by identifying the sensor with the highest signal strength. In one embodiment, the X-Y coordinate location is inferred by associating the sensor location with the highest signal strength with the item's X-Y coordinate location. A Z coordinate location may be determined based upon signal strength received by the beacon 60 and predefined calibrated data, linking height to signal strength at particular X-Y coordinates. In various embodiments, location may be determined using one or more triangulation calculations. In one embodiment, graphical information from a camera may be used to determine a location. In one embodiment, varying positions of the array 40 and/or the beacon 60 may be used to determine location.

In one embodiment, vectors are calculated based upon position changes over time. The vector can be used to infer status or classification changes associated with an item.

At step 312, the system 100 may infer item status based upon the determined location. For example, items proximate to the scanning table 50 may be inferred to be "checked-in." Operating modes of the system 100 may be used in conjunction with the location to update the status and classification of an item. For example, during a check-in mode, items on the table may be inferred to be "checked-in", while during a post-operation mode, items on the table may be inferred to be "not sterile." In various embodiments, locations in the room may be defined and associated with pre-defined categories that may be then used for inferring item's status or classification. For example, items off the scanning table 50 may be inferred to be "not sterile", items having a location associated with a garbage receptacle may be inferred to be "discarded" and/or "needs replacement", items proximate to an operating table may be inferred to be "not sterile" and "checked-out."

At step 314, the system 100 updates the database based upon the inferring.

The schematic flow chart diagrams included herein are generally set forth as logical flow chart diagrams. As such, the depicted order and labeled steps are indicative of one embodiment of the presented process. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the process. For example, an arrow may indicate a waiting or monitoring period of unspecified duration between enumerated steps of the depicted process. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Additionally, the order in which a particular method occurs may or may not strictly adhere to the order of the corresponding steps shown. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures. For example, steps 210, 212 and 214 may be executed concurrently in some embodiments.

Additionally, examples in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C#, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

The invention claimed is:

1. A system for continuously and automatically tracking and managing medical tools associated with a medical procedure, the system comprising:
   i) medical tools or instruments;
   ii) a scanning table;
   iii) one or more sensor arrays comprising a plurality of sensors, wherein the sensor arrays are spaced over the scanning table in a sterile field and any place outside of the sterile field associated with the medical procedure to determine each status of the tools or instruments which have been contaminated or damaged and removed from the sterile field to prevent reuse; and iv) one or more computer readable medium comprising a computer program product for performing the steps of:
a) receiving a list of the medical tools or instruments;
b) associating each medical tool or instrument within the list a status and real-time data specific and characteristic of any sub-classifications of the medical tools or instruments;
c) continuously monitoring information associated with a radio frequency identification (RFID) associated with each medical tool or instrument within the list, wherein the monitoring is executing using the one or more sensor arrays comprising the plurality of sensors, wherein the information comprises a real-time status of each medical tool or instrument within the list;
d) detecting a presence of each medical tool or instrument within the list based upon the monitoring;
e) automatically and continuously collecting time and duration of use of each medical tool or instrument within the list, wherein the duration is calculated by the time associated with presence and absence of each medical tool or instrument within the list from the location;
f) changing the status associated with each medical tool or instrument within the list based upon the detecting, wherein the status comprises i) checked-in or checked-out, ii) sterile or not sterile, iii) pre-surgery, real-time during surgery, or post-surgery, iv) in use or not in use, v) real-time characteristics of each medical tool or instrument associated with a medical procedure or surgery, and vi) real-time maintenance schedules and inventory management of each medical tool or instrument; and
g) displaying the status associated with the each medical tool or instrument within the list on a display monitor.

2. The system of claim 1, wherein the steps further comprise:
receiving sensing information from the plurality of sensors, wherein the sensing information includes a signal amplitude corresponding to the RFID; and
determining location of each medical tool or instrument within the list based upon the signal amplitude received by at least one sensor of the plurality of sensors.

3. The system of claim 2, wherein the determining the location of each medical tool or instrument within the list based upon the signal amplitude received by at least one sensor of the plurality of sensors is executed using triangulation.

4. The system of claim 1, wherein the plurality of sensors is over the surface of the scanning table or under or embedded within the scanning table.

5. The system of claim 4, wherein the plurality of sensors are associated with a geometric plane.

6. The system of claim 5, wherein the steps further comprise: monitoring information associated with the RFID associated with each medical tool or instrument within the list using a sensor associated with an axis perpendicular to the geometric plane.

7. The system of claim 1, wherein the steps further comprise:
determining a location of each medical tool or instrument within the list based upon the monitored information associated with the RFID; and
further changing the status of each medical tool or instrument within the list based upon the determined location.

8. The system of claim 7, wherein the steps further comprise:
predefining locations in a room and associating those locations with status or classification changes; and
further changing the status of each medical tool or instrument within the list based upon a proximity of each medical tool or instrument within the list to the predefined locations.

9. The system of claim 1, wherein the steps further comprise:
associating an object with a unique RFID identifier;
determining a location of each medical tool or instrument within the list based upon the monitored information associated with the RFID;
determining a location of the object; and
further changing the status of each medical tool or instrument within the list based upon a proximity of each medical tool or instrument within the list to the object.

10. The system of claim 1, wherein the steps further comprise:
automatically and continuously associating a person with a unique wearable RFID identifier;
determining a location of each medical tool or instrument within the list based upon the monitored information associated with the RFID;
determining a position of the person based upon the unique wearable RFID identifier; and
further changing the status of each medical tool or instrument within the list based upon a proximity of each medical tool or instrument within the list to the person.

11. The system of claim 1, wherein each sensor of the plurality of sensors is associated with a unique X-Y-Z coordinate; and
determining a location of each medical tool or instrument within the list based upon sensing information from the plurality of sensors and the X-Y-Z coordinates associated with the each of the plurality of sensors.

12. The system of claim 1, wherein the steps further comprise:
receiving a user-supplied operating mode selection; and
further changing the status of each medical tool or instrument within the list based upon the received user-supplied operating mode.

13. A system for continuously and automatically tracking and managing medical tools associated with a medical procedure, the system comprising:
i) medical tools or instruments;
ii) a scanning table;
iii) one or more sensor arrays comprising a plurality of sensors, wherein the sensor arrays are spaced over the scanning table in a sterile field and any place outside of the sterile field associated with the medical procedure to determine each status of the tools or instruments which have been contaminated or damaged and removed from the sterile field to prevent reuse; and
iv) one or more computer readable medium comprising a computer program product for performing the steps of:
a) receiving a list of the medical tools or instruments;
b) associating each medical tool within the list a status and real-time data specific and characteristic of any sub-classifications of the medical tools or instruments, wherein the status comprises i) checked-in or checked-out, ii) sterile or not sterile, iii) pre-surgery, real-time during surgery, or post-surgery, iv) in use or not in use, v) real-time characteristics of each medical tool or instrument associated with a medical procedure or surgery, and vi) real-time maintenance schedules and inventory management of each medical tool or instrument, wherein the status is defaulted to the checked-out status, sterile status, and not in use status;

c) continuously monitoring and recording, over a period of time, information associated with a radio frequency identification (RFID) associated with each medical tool or instrument within the list, wherein the monitoring is executing using the one or more sensor arrays comprising the plurality of sensors, wherein the information comprises real-time status of each medical tool or instrument within the list d) detecting a presence of each medical tool or instrument within the list based upon the monitoring;

e) automatically and continuously collecting time and duration of each medical tool or instrument within the list, wherein the duration is calculated by the time associated with presence and absence of each medical tool or instrument within the list from the location;

f) determining a location of each medical tool or instrument within the list based upon the monitoring;

g) changing the status associated with each medical tool or instrument within the list to checked-in status based upon the detecting and the determined location, wherein the status comprises i) checked-in or checked-out, ii) sterile or not sterile, and iii) pre-surgery, real-time during surgery, or post-surgery, iv) in use or not in use, v) real-time characteristics of each medical tool or instrument associated with a medical procedure or surgery, and vi) real-time maintenance schedules and inventory management of each medical tool or instrument; and i) displaying the status associated with each medical tool or instrument within the list on a display monitor.

14. The system of claim 13, wherein the plurality of sensors is over a surface of the scanning table or under or embedded within the scanning table.

15. The system of claim 13, wherein the steps further comprise:
predefining locations in a room and associating those locations with status or classification changes;
further changing the status of each medical tool or instrument within the list based upon a proximity of each medical tool or instrument within the list to the predefined locations.

16. The system of claim 13, wherein the steps further comprise:
associating an object with a unique RFID identifier;
determining a location of each medical tool or instrument within the list based upon the monitored information associated with the RFID;
determining a location of the object based upon the unique RFID identifier; and
further changing the status of each medical tool or instrument within the list based upon a proximity of each medical tool or instrument within the list to the object.

17. The system of claim 13, wherein the steps further comprise:
associating a person with a unique wearable RFID identifier;
determining a location of each medical tool or instrument within the list based upon the monitored information associated with the RFID;
determining a position of the person based upon the unique wearable RFID identifier; and
further changing the status of each medical tool or instrument within the list based upon a proximity of each medical tool or instrument within the list to the person.

18. The system of claim 13, wherein the steps further comprise:
monitoring information associated with the RFID associated with each medical tool or instrument within the list using a sensor associated with an axis perpendicular to the geometric plane, wherein each sensor of the plurality of sensors is associated with a unique X-Y-Z coordinate; and
determining a location of each medical tool or instrument within the list based upon sensing information from the plurality of sensors and the X-Y-Z coordinates associated with the each of the plurality of sensors.

19. The system of claim 13, wherein the steps further comprise:
receiving a user-supplied operating mode selection; and
further changing the status of each medical tool or instrument within the list based upon the received user-supplied operating mode.

20. A system for continuously and automatically tracking and managing medical tools associated with a medical procedure, the system comprising:
i) medical tools or instruments;
ii) a scanning table;
iii) one or more sensor arrays comprising a plurality of sensors, wherein the sensor arrays are spaced over the scanning table in a sterile field and any place outside of the sterile field associated with the medical procedure to determine each status of the tools or instruments which have been contaminated or damaged and removed from the sterile field to prevent reuse; and
iv) one or more computer readable medium comprising a computer program product for performing the steps of:
a) receiving a list of medical tools or instruments;
b) receiving a user-supplied operating mode selection;
c) predefining locations in a room and associating those locations with status or classification changes;
d) associating an object with a unique RFID identifier;
e) determining a location of the object based upon the unique RFID identifier;
f) associating each medical tool within the list a status and real-time data specific and characteristic of any sub-classifications of the medical tools or instruments;
g) continuously monitoring, over a period of time, information associated with a radio frequency identification (RFID) associated with each medical tool or instrument within the list, wherein the monitoring is executing using one or more sensor arrays comprising a plurality of sensors, wherein the information comprises real-time status of each medical tool or instrument within the list;
h) detecting a presence of each medical tool or instrument within the list based upon the continuous monitoring;
i) confirming the presence of each medical tool or instrument within the list based upon received graphical information from a camera;
j) intuitively, determining a location of each medical tool or instrument within the list based upon the continuous monitoring;
k) changing the status associated with each medical tool or instrument within the list based upon the detecting, the determined location, the received user-supplied operating mode, a proximity of each medical tool or instrument within the list to the object, and a proximity of each medical tool or instrument within the list to the predefined locations, wherein the status comprises i) checked-in or checked-out, ii) sterile or not sterile, and iii) pre-surgery, real-time during surgery, or post-surgery; iv) in use or not in use, v) real-time characteristics of each medical tool or instrument associated with a medical procedure or surgery, and vi) real-time maintenance schedules and inventory management of each medical tool or instrument; and l) displaying the status associated with each medical tool or instrument within the list on a display monitor.

21. The system of claim 20, wherein the plurality of sensors is over a surface of the scanning table or under or embedded within the scanning table top.

22. The system of claim 20, wherein the steps further comprise: confirming the presence of each medical tool or instrument within the list based upon a weight measurement.

23. The system of claim 1, wherein the scanning table is a surgical table, operating room table, a scanning table, a medical tool table, a scrub nurse or technician's back table, Mayo stand type and/or smaller table, or any table used for medical procedure or surgery.

24. The system of claim 1, wherein the sensor arrays are spaced over a working surface, a tray, a wall or a ceiling in a medical environment.

25. The system of claim 1, wherein the monitoring is executing using the one or more sensor arrays comprising the plurality of sensors and a beacon scanner, wherein the beacon scanner is mounted or movable on the scanning table or outside of the sterile field associated with the medical procedure and configured to continuously scan up to 360 degrees in all 3 spatial planes.

26. The system of claim 1, wherein the information and status of each medical tool or instrument within the list are transmitted to authorized uses associated with any individual hospital departments or systems, the departments or systems of hospital groups or chains, individual or groups of patients or patient families, physicians or surgeons and/or their offices or staffs, OEM or other entities present at the operation or remote from the site.

\* \* \* \* \*